United States Patent [19]
Huizenga et al.

[11] Patent Number: 6,132,052
[45] Date of Patent: Oct. 17, 2000

[54] HOUSING WITH INTEGRAL ELECTRICAL CONNECTORS FOR A REARVIEW MIRROR ACTUATOR ASSEMBLY

[75] Inventors: David J. Huizenga; Robert Lee Bingle; Desmond J. O'Farrell; David Kevin Willmore, all of Holland, Mich.

[73] Assignee: Donnelly Corporation, Holland, Mich.

[21] Appl. No.: 09/304,192

[22] Filed: May 3, 1999

Related U.S. Application Data

[62] Division of application No. 08/780,996, Jan. 9, 1997, Pat. No. 5,900,999.

[51] Int. Cl.$^7$ .................................................. G02B 7/182
[52] U.S. Cl. .................. 359/877; 359/872; 359/874; 248/477; 248/479; 362/83.1; 362/80; 362/140
[58] Field of Search .................................. 359/877, 872, 359/874; 248/477, 479; 362/83.1, 80, 140

[56] References Cited

U.S. PATENT DOCUMENTS

| | | | |
|---|---|---|---|
| 3,999,160 | 12/1976 | McDonnell | 340/119 |
| 4,114,988 | 9/1978 | Enomoto | 350/289 |
| 4,482,211 | 11/1984 | Fisher | 350/637 |
| 4,498,738 | 2/1985 | Kumai | 350/637 |
| 4,678,295 | 7/1987 | Fisher | 350/634 |
| 4,740,068 | 4/1988 | Fisher | 350/634 |
| 4,770,522 | 9/1988 | Alten | 350/633 |
| 4,815,837 | 3/1989 | Kikuchi et al. | 350/637 |
| 4,915,493 | 4/1990 | Fisher et al. | 350/364 |
| 4,930,370 | 6/1990 | Yoshida | 74/502.1 |
| 5,311,368 | 5/1994 | Tsuyama | 359/877 |
| 5,801,914 | 9/1998 | Thrash | 361/104 |

FOREIGN PATENT DOCUMENTS

| | | |
|---|---|---|
| 0463563 | 1/1992 | European Pat. Off. . |
| 2237252 | 5/1991 | United Kingdom . |

OTHER PUBLICATIONS

Photographs (5) of an actuator housing sold by Bosch since before Jan. 9, 1996.

*Primary Examiner*—Cassandra Spyrou
*Assistant Examiner*—Mohammad Y. Sikder
*Attorney, Agent, or Firm*—Van Dyke, Gardner, Linn & Burkhart, LLP

[57] ABSTRACT

A housing for an actuator assembly for adjusting the orientation of a mirror element in a mirror assembly provides an improved electrical distribution system that eliminates loose wires, most connections, and the need for a seal between the housing and its external connections to a vehicle power supply. The housing includes a housing member supporting at least one actuator motor for driving at least one mirror element positioning member. The positioning member extends from the housing member to engage the mirror element's backing plate. The motor is powered from the vehicle power supply through the electrical distribution system which is molded with the housing member. Preferably, the electrical distribution system includes a plurality of leads that are electrically coupled at their distal ends to a plurality of external connectors, which extend out of the housing member for external connection to the vehicle power supply. Portions of the external connectors are molded with the leads and the housing member so that no seal is required between the housing and the extending connectors of the electrical distribution system.

22 Claims, 5 Drawing Sheets

HOUSING WITH INTEGRAL ELECTRICAL CONNECTORS FOR A REARVIEW MIRROR ACTUATOR ASSEMBLY

This is a division of application Ser. No. 08/780,996, filed on Jan. 9, 1997, now U.S. Pat. No. 5,900,999 which is incorporated in its entirety by reference herein.

TECHNICAL FIELD AND BACKGROUND OF THE INVENTION

The present invention relates to a mirror actuator assembly which is used in vehicles for remote adjustment of a reflective mirror element in a rearview mirror assembly, especially an exterior rearview mirror assembly. More particularly, the present invention relates to the housing for the mirror actuator assembly and to an improved electrical distribution system within the housing.

Mirror actuator assemblies used to adjust the orientation of a mirror element supported in a mirror assembly typically include at least one or more motors and appropriate gearing. The actuator motor drives the gearing, which in turn drives a positioning member. The positioning member extends from the gearing and through the mirror actuator housing to engage the back of the mirror element backing plate. Conventional mirror backing plates include a ball mount or semi-spherical structure that engages a pivot structure on the actuator housing so that the mirror element and mirror backing plate can freely pivot as a unit about the pivot structure. As the positioning member is extended and withdrawn in and out of the actuator housing, the mirror element and mirror backing plate rotate about an axis extending through the pivot structure.

The actuator motor is powered by a 12-volt supply from the vehicle or vehicle ignition system through an electrical distribution system in the actuator housing, which electrically couples the motor to the vehicle power supply, and is generally powered in the 9-volt to 16-volt, 12-volt nominal range. Conventional electrical distribution systems comprise a plurality of wires that extend from the motor's positive (+) terminal to the power supply and from the motor's negative (−) terminal to ground. Typically, the wires' proximate ends are soldered or crimped to motor connectors which electrically couple the wires to the motor's terminals. The wires, extending from the motor and actuator housing, are then soldered or crimped at their distal ends to external connectors for coupling to the vehicle power supply.

Several problems have developed with the conventional electrical distribution systems in mirror actuators. Because these electrical distribution systems include loose wires that are fixed only at two points—at the motor terminals and at the point where the wires leave the housing for connection to the vehicle power supply—they are subject to vibration, which may result from the vehicle engine, from travel over rough roads, or from wind pressure on the mirror assembly. Vibration can cause the wires to disconnect and to contact adjacent wires or conductive surfaces creating a short or a non-functional mirror. Furthermore, the manufacture of such an actuator with a conventional electrical distribution system is labor intensive. The wires are cut to length. The insulation on the wires must be removed at their distal ends. Then the proximate and distal ends of the wires are soldered or crimped or otherwise permanently attached to motor connectors and external connectors. The motor connectors are then soldered or otherwise permanently coupled to the motor's terminals. The wires are then positioned in the housing and directed out of the housing. Those portions of the wires which extend exteriorly of the housing are then, typically, bundled together in a harness for protection.

In another conventional actuator assembly, the electrical distribution system comprises three metal plates which extend from inside the housing to outside the housing. One plate extends to the respective ground terminals of two motors housed in the actuator assembly housing, and the other two plates extend to the respective power terminals of the two motors. The plates include bent ends for connecting to the motors and extend from the housing body into a plug connection port provided on the housing wall exterior for connection to a vehicle power supply. The plates are installed by snapping them into a pre-molded housing base and are held in place by abutments formed on the molded housing base. The disadvantage of this particular electrical distribution system is that it requires tight fabrication tolerances on the plates and on the housing and the housing abutments, which hold the plates in place. Moreover, this assembly process is also highly labor intensive and, as the ends of the plates extend through exit holes provided in the side wall of the base, a sealant is still required to prevent moisture and debris from entering the actuator housing through the exit holes. Lastly, the assembly process may subject the plates to damage. When snapped into the place, the plates are easily bent and, consequently, may no longer provide good contact with the motors.

SUMMARY OF THE INVENTION

Accordingly, the present invention provides a housing for a mirror actuator assembly, especially for vehicular rearview mirrors, which includes an improved electrical distribution system. The electrical distribution system is molded into the base compartment of the housing to electrically couple the motor or motors of the actuator assembly to a vehicle power supply source. Thus, loose or add-on wiring and most connections associated with the conventional electrical distribution systems of mirror actuators are eliminated. Moreover, because the external connectors of the electrical distribution system of the present invention, which extend from the housing and connect to the vehicle power source, are also molded with the base compartment, no sealant is required.

The preferred electrical distribution system comprises an electrical bus system with integral motor connectors. By integrally molding a bus system in the housing, the present invention essentially eliminates the internal wiring and, therefore, the manual insertion of electrical connectors, which results in significant savings of time and costs. Furthermore, the present invention eliminates the attendant problems with manual wiring, including the potential for mis-wiring and its associated costs. Moreover as the bus system includes integrally formed motor connectors, the present invention eliminates all soldered connections—again, saving time and costs, reducing the potential for mis-wiring, and improving the durability of the electrical connections.

According to one aspect of the invention, a mirror actuator housing includes a base compartment, which supports at least one mirror positioning member and at least one motor which drives the mirror positioning member. A mirror backing plate, which supports a mirror element, pivotally connects to the positioning member and to a pivot structure formed on the actuator housing. As the positioning member is moved with respect to the actuator housing, the mirror backing plate pivots about the pivot structure to adjust the orientation of the mirror element. The base compartment includes an integrally molded electrical distribution system having a plurality of electrical connections, which extend through a portion of the base compartment for electrically coupling to a vehicle power supply. At least a portion of the electrical connection members are integrally molded with the housing to seal the electrical connection members with the housing members.

In preferred aspects of the invention, the electrical distribution system comprises a plurality of leads formed from conductive material. The leads extend from the motor to the perimeter of the base compartment and couple to wires, which are also integrally molded with the housing base compartment. The wires are electrically coupled to the leads before molding and extend through the side wall of the housing base compartment to electrically couple the leads and motors to the vehicle power supply. The wires may be electrically coupled to the lead by one or more electrical coupling methods, such as crimping, welding, insulation displacement, soldering, or other known means of electrical termination.

In other preferred aspects of the invention, the electrical distribution system includes a male plug connection for the vehicle power supply connection. Preferably, the electrical distribution system comprises a plurality of leads. Each lead extends from the motor to the exterior of the housing and projects from the base compartment to form prongs for the plug connection. Therefore, this embodiment eliminates all soldered connections.

In other aspects, the base compartment of the housing includes a plug receiving port. The electrical distribution system leads extend from the motor and into the port to form prongs onto which a vehicle power supply plug can slide. Since the port side walls surround the lead prongs, the prongs are protected from damage.

In another aspect, electrical distribution system includes leads extending into a plug receiving port. The leads are integrally molded with a side wall of the port and are positioned flush with the inner surface of the side wall to provide contact surfaces. A power supply plug slides into the plug receiving port and makes contact with the contact surfaces of the leads with biased electrical contacts to electrically couple the leads to the vehicle power supply.

In yet another aspect of the invention, the electrical distribution system comprises a bus frame having a plurality of externally projecting lead pins. The lead pins are electrically coupled to the bus frame and insert molded along with the bus frame in the base compartment. The lead pins project from the housing to provide means for electrically coupling the bus frame and motors to the vehicle power supply.

Accordingly, the present invention provides a simplified actuator assembly by molding an electrical distribution system in the housing of the actuator assembly. The electrical distribution system of the present invention eliminates the need for the labor intensive soldered connections in the electrical distribution circuits used in conventional actuator assemblies. Furthermore, the integral electrical distribution system eliminates the potential for mis-wiring associated with conventional electrical distribution circuits and reduces the potential for electrical shorts that can develop in conventional actuator assemblies from vibration. Consequently, the integral electrical distribution system improves the durability and the reliability of the actuator assembly. Moreover, the integrally molded electrical distribution system eliminates the need for a sealant between the external connectors of the electrical distribution system and the actuator housing.

These and other objects, advantages, purposes and features of the invention will become more apparent from a study of the following description taken in conjunction with the drawings.

DESCRIPTION OF THE PREFERRED EMBODIMENTS

Figure 1:
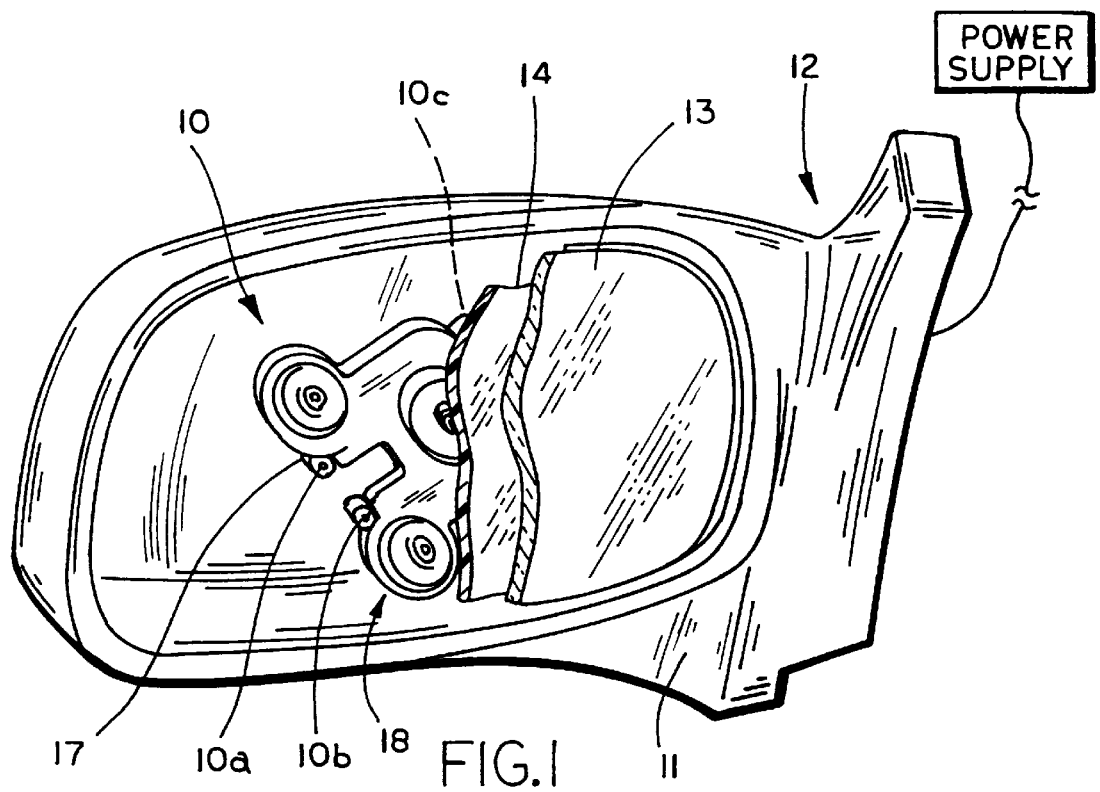
FIG. 1 is a perspective view of an actuator assembly of the present invention supported in an exterior rearview mirror assembly.

Referring to FIG. 1, the actuator assembly 10 of the present invention is shown mounted in a modular housing 11 of an exterior rearview mirror assembly 12 of a vehicle (not shown). Modular housing 11 carries an adjustable mirror element 13, which is supported by actuator assembly 10 on a backing plate 14. Actuator assembly 10 is provided for remote adjustment of mirror element 13 and backing plate 14 as a unit and pivotally engages the backing plate to adjust the orientation of the mirror element through motor driven, telescoping, positioning members 15 and 16. The telescoping positioning members 15 and 16 include ball members 36a, 38a having projecting pins 36b, 38b and push and pull on the backing plate 14 causing the mirror element 13 to pivot about one or more axes, as will be herein more fully described.

Actuator assembly 10 is supported in mirror assembly 12 by a frame (not shown) and secured to the frame by a plurality of threaded fasteners 10*a,* 10*b,* and 10*c* which extend through bosses 17 provided on the actuator housing 18 of actuator assembly 10. Actuator housing 18 preferably includes a split construction housing having a first or base housing member 19 and a second or upper housing member 20. Actuator housing 18 may also comprise a single molded member having a living hinge that divides the member into two sections, which fold to form an enclosure, for example a clam shell housing. Preferably, the housing members are molded from a non-conductive material such as resinous plastic. More preferably, housing members 19 and 20 comprise nylon, polybutylene terephthalate (PBT), acetal or other suitable molding or melt processable resins. Most preferably, housing members 19 and 20 comprise an acrylonitrile butadiene styrene (ABS) material, which is available under the trade name of MAGNUM from Dow Chemical of Midland, Mich.

First or base housing member 19 includes a base wall 21 and a side wall 22 that extends around the perimeter of the base wall 21 to form a base compartment 23. Second housing member 20 preferably includes connectors 20a that secure second housing member 20 to first housing member 19 to cover and protect the devices supported in housing, as will be described below.

Figure 3:
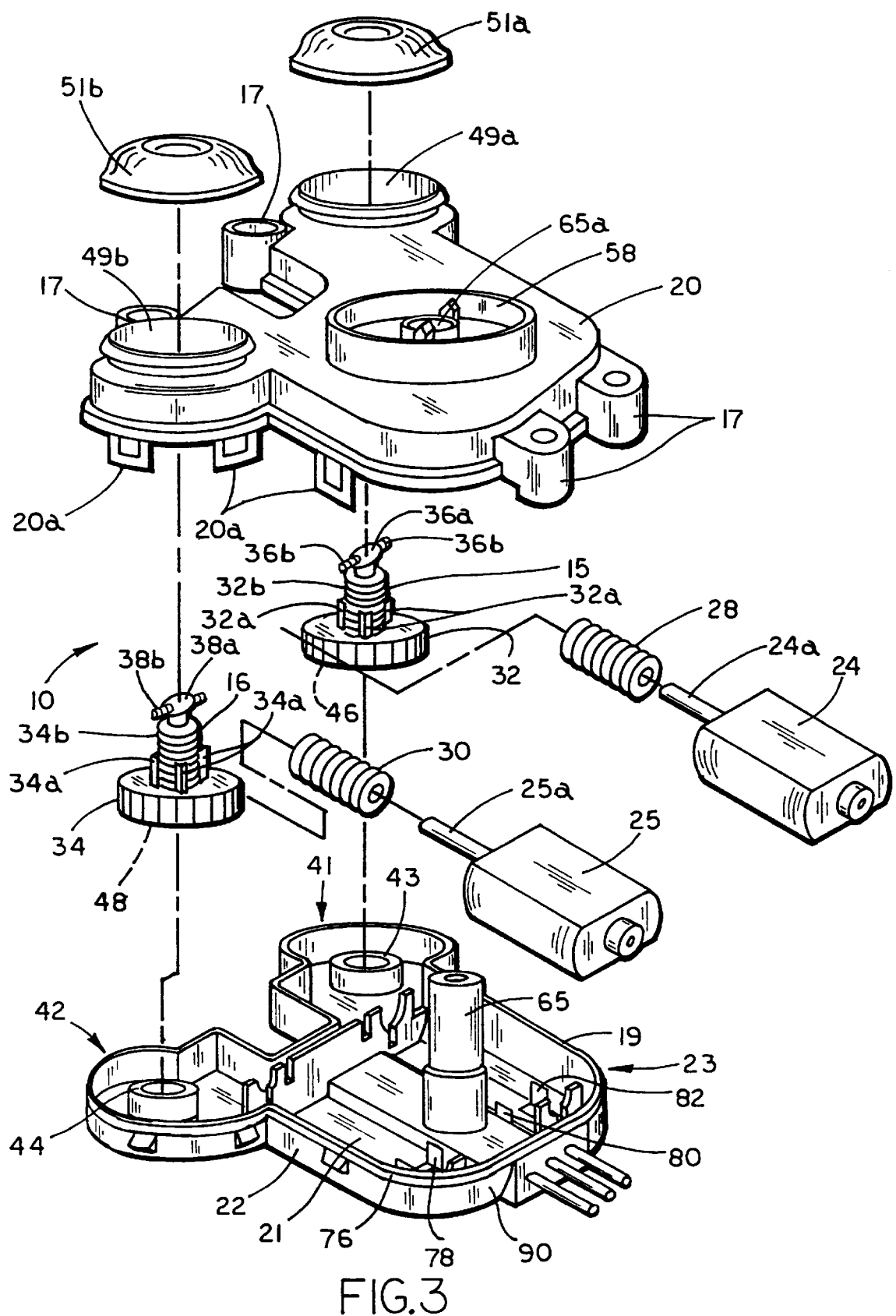
FIG. 3 is an exploded perspective view of the actuator assembly of FIG. 1.
Figure 4:
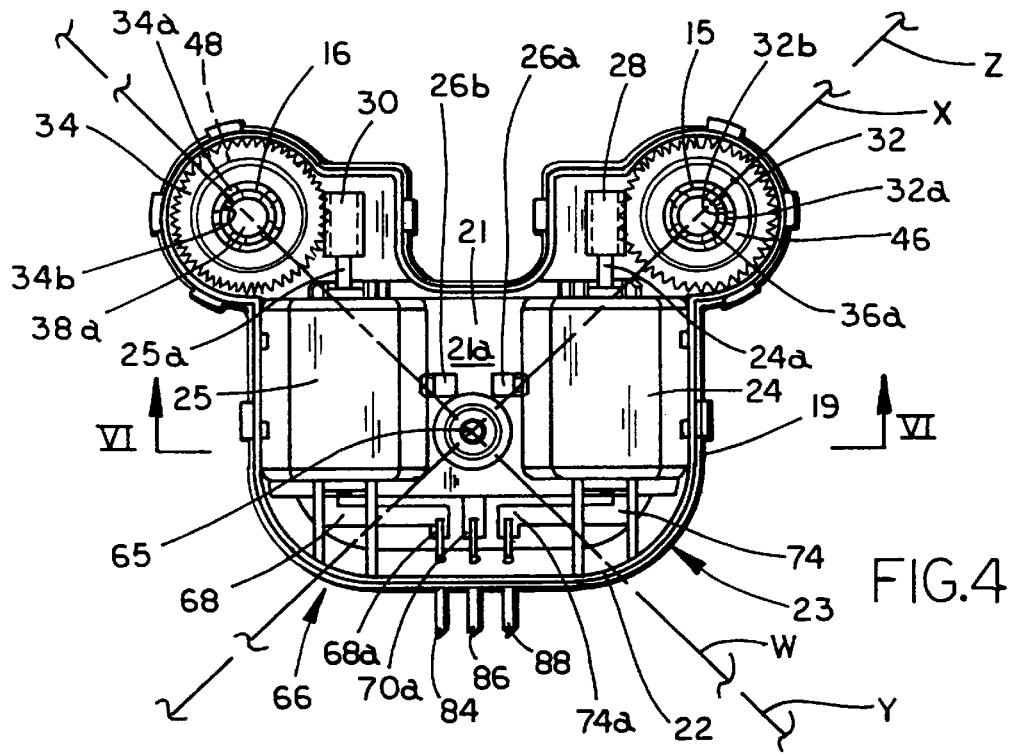
FIG. 4 is a top plan view of the base of the actuator assembly of FIG. 1 including electric motors and positioning member gear assemblies.
Figure 5:
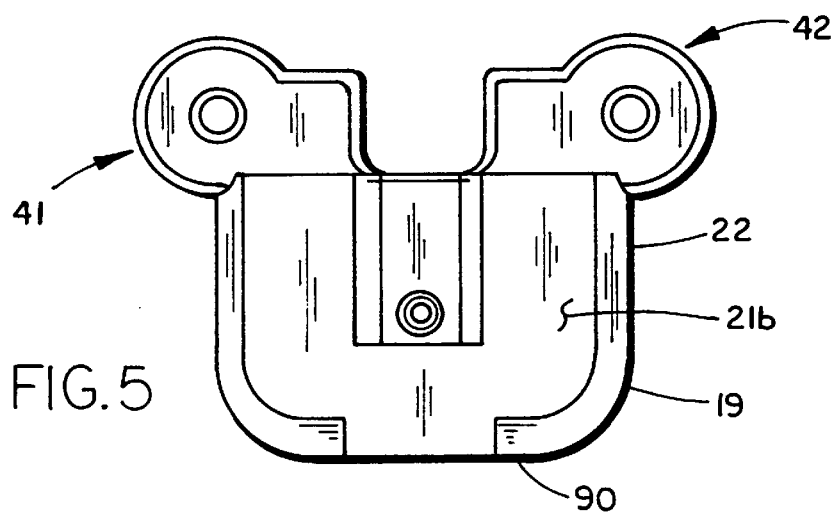
FIG. 5 is a bottom plan view of the actuator assembly base.
Figure 6:
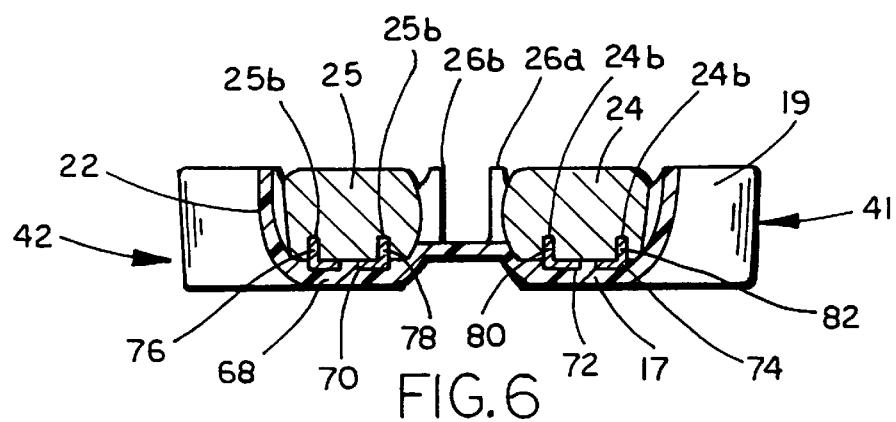
FIG. 6 is a sectional view of the base taken along line VI—VI of FIG. 4.

Base compartment 23 houses a pair of reversible electric motors 24 and 25 which are supported on base wall 21 of base compartment 23 and are held in place by resilient arms 26*a* and 26*b* that extend from the base wall 21 in a snap fit arrangement (FIGS. 4 and 6). As best seen in FIGS. 3 and 4, the shafts 24*a* and 25*a* of reversible electric motors 24 and 25 include worm gears 28 and 30 for driving gearing or gear assemblies 32 and 34, also housed and supported for rotational movement in base compartment 23. Gear assemblies 32 and 34, in turn, drive telescoping positioning members 15 and 16 to adjust the orientation of mirror element 13 and backing plate 14 housed in mirror assembly 12. Preferably, motors 24, 25 are sold under the model number FC-260RD available from Mabuchie Motor, New York, N.Y.

Figure 2:
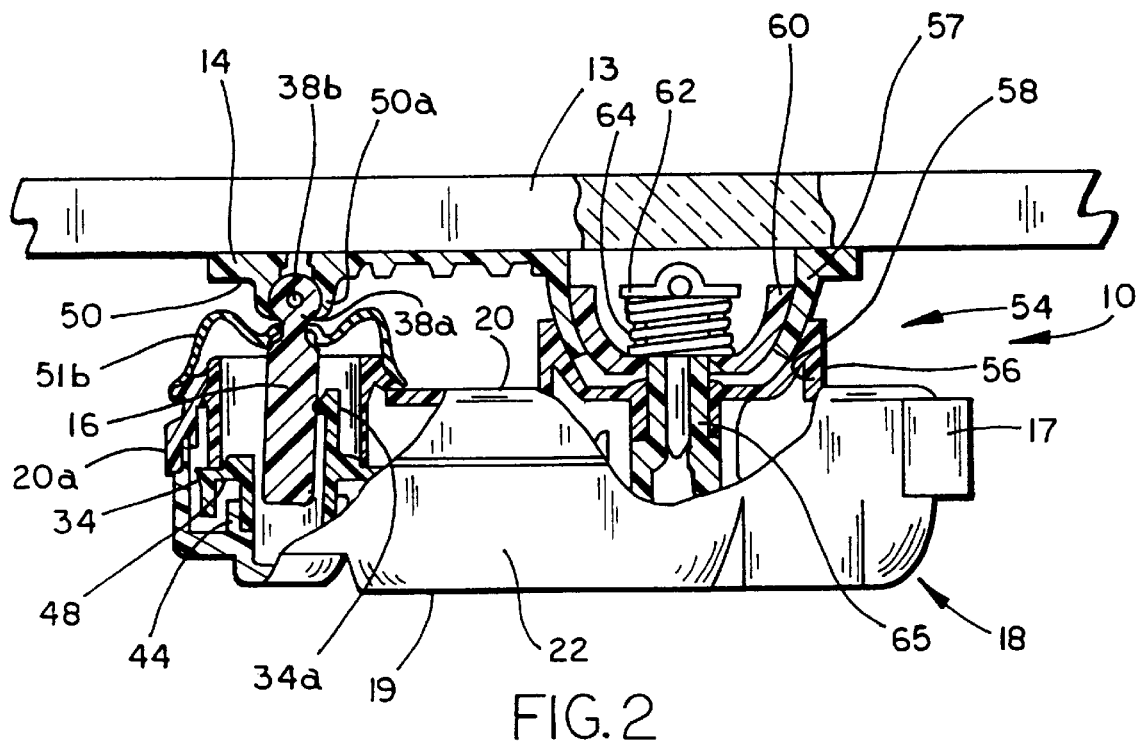
FIG. 2 is a side elevation of the actuator assembly of FIG. 1 with the mirror element attached and portions broken away illustrating the mirror positioning members and the pivot structure.

As best seen in FIGS. 2–4 and 7, gear assemblies 32 and 34 are supported on and journaled in cylindrical receptacles 41 and 42 formed in first housing member 19. Receptacles 41 and 42 include annular walls 43 and 44 which extend into annular recesses 46 and 48 formed on the bottom surfaces of the gears of gear assemblies 32 and 34 to rotatably support gear assemblies 32 and 34 in base compartment 23. Each gear assembly 32, 34 includes a plurality of circumferentially spaced projecting arms 32a, 34a with a thread formed at each of their respective distal ends for engaging and meshing with threads on positioning members 15 and 16. Each plurality of projecting arms 32*a,* 34*a* define passages 32*b,* 34*b* therebetween which extend through the gears of gear assemblies 32 and 34, respectively, to receive telescoping positioning members 15 and 16. The positioning members are connected to sockets 50*a* on the back of backing plate 14 and are held against rotation by pins 36*b,* 38*b* in those sockets. When gear assembly 32 is driven, projecting arm 32*a* rotates with gear assembly 32 to drive non-rotational positioning member 15 to telescope in or out of passage 32*b,* depending the direction of the gear's rotation. Similarly, when gear assembly 34 is driven, projecting arm 34*a* drives positioning member 16 to telescope in or out of passage 34*b.* As positioning members 15, 16 telescope in and out of passages 32*b,* 34*b,* end portions of the positioning members extend and retract through openings 49*a* and 49*b* provided in second housing member 20 to pivotally engage sockets 50*a* on the back surface 50 of backing plate 14 of mirror element 13 (FIG. 2). The ball and socket connection permits the backing plate 14 to be supported by positioning members 15 and 16, but free to pivot about the positioning members' distal ends, while pins 36*b,* 38*b* extending transversely from distal end 36*a,* 38*a* of members 15 and 16 prevent the members from rotating.

When activated, one motor drives shaft 24*a,* while the other motor drives shaft 25*a.* Shafts 24*a* and 25*a* drive gear assemblies 32 and 34 through worm gears 28 and 30. As described above, when gear assemblies 32 and 34 are driven, positioning members 15 and 16, which engage the threads in on projecting arms 32*a* and 34*a,* telescope in and out of gear assemblies 32 and 34 and, thus, extend from or retract into actuator housing 18 through openings 49*a* and 49*b* in second housing member 20. Preferably, openings 49*a* and 49*b* include flexible weather sealing diaphragms or boots 51*a* and 51*b* which seal openings 49*a,* 49*b* around positioning members 15 and 16. As described above, positioning members 15 and 16 project through the second housing member 20, which provides a cover to base compartment 23 of actuator housing 18, to engage the back surface 50 of mirror backing plate 14 and are used to adjust the orientation of the mirror element 13 by the telescoping action of the positioning members. Since there are two positioning members, the mirror element can be manipulated to rotate about a plurality of axes, as will be more fully described below.

As shown in FIGS. 2–4, second housing member 20 includes a pivot assembly 54 which cooperates with the mirror backing plate to fix the mirror element's point or center of rotation. Pivot assembly 54 includes a socket member 56 formed integrally on housing 20 that cooperates with a truncated, semi-spherical flange 57 formed on back surface 50 of mirror backing plate 14. The socket member 56 includes a semi-spherical recess 58 and a semi-spherical insert 60 that is rotationally fixed to the semi-spherical recess 58 by a pivot screw 62 and pivot spring 64. As best seen in FIG. 2, pivot screw 62 extends through pivot spring 64 and insert 60 and into a threaded boss structure 65 that projects through passage 65*a* in recess 58. Semi-spherical flange 57 is interposed and slidably captured between insert 60 and recess 58 such that mirror backing plate 14 is free to pivot about pivot assembly 54 on semi-spherical flange 57. When positioning member 15 extends, mirror backing plate 14 and mirror element 13 pivot on pivot structure 54 about axis W. Similarly, when pivoting member 16 extends, mirror backing plate 14 and mirror element 13 pivot on pivotal structure 54 about axis X. Note that when positioning member 15 extends or retracts, the orientation of axis W is changed but remains along plane Y. Similarly, when positioning member 16 extends or contracts, axis X moves up and down along plane Z. Consequently, the orientation of mirror element 13 can be changed to an infinite number of positions between the bounds of the fully extended and fully retracted positions of the positioning members and any combination thereof.

Motors 24 and 25 are powered by a vehicle power source, for instance a vehicle battery (not shown), through an electrical distribution system 66 integrally molded with the first housing member 19 (FIGS. 4 and 6–15). By integrally molding the electrical distribution system with the housing, numerous advantages are gained. The electrical distribution system is simple and easy to install. The integral electrical distribution system is significantly more reliable since there is little or no opportunity for mis-wiring. Moreover, as the distribution system 66 is molded with first housing member 19, the resinous material completely fills in the space around the distribution system 66 and leaves no gaps between the distribution system 66 and the first housing member 19.

Figure 7:
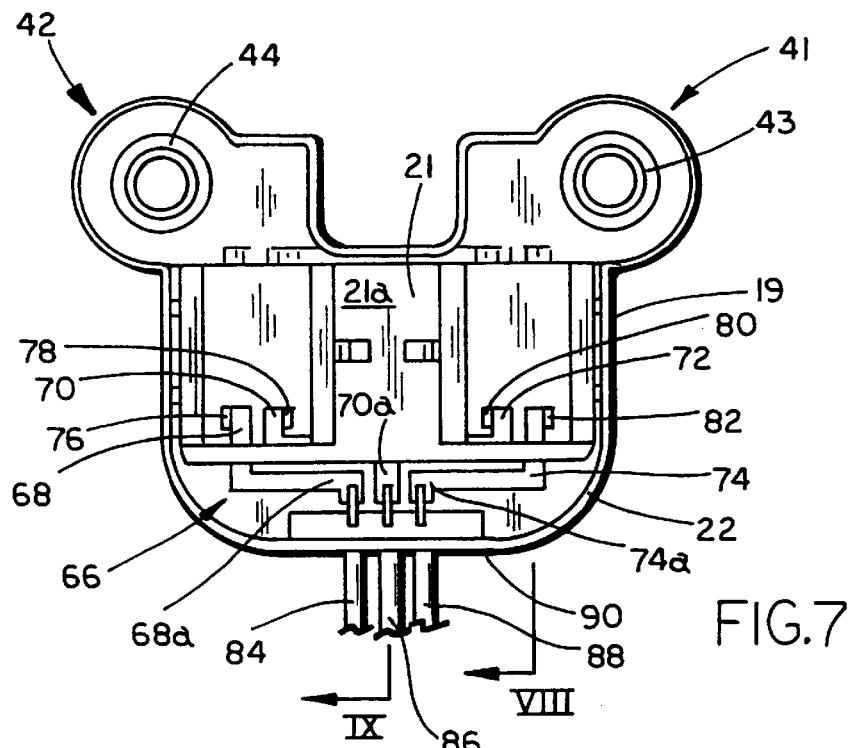
FIG. 7 is a top plan view of the base with the motors and gear assemblies removed.
Figure 8:
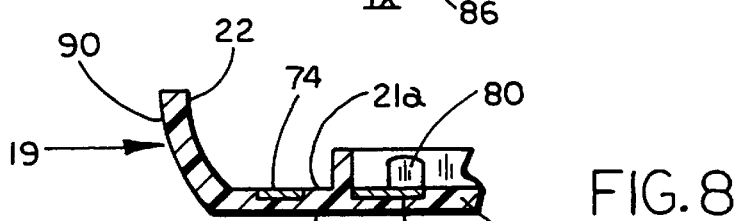
FIG. 8 is an enlarged sectional view taken along line VIII—VIII of FIG. 7 illustrating one lead of the bus and an electrical connector for the motor.

When the distribution system extends from the first housing, the portion that is molded with the base is completely encapsulated leaving no space or gaps for water, debris and other contaminants to enter the housing. Consequently, no sealant is required. Furthermore, since there are no gaps, the distribution system 66 does not move and the attendant problems that arise from vibration are eliminated As best shown in FIGS. 4 and 7, electrical distribution system 66 extends from motors 24 and 25 to the perimeter of the base wall 21 adjacent side wall 22 for connection to the vehicle power supply. In the preferred embodiment illustrated in FIGS. 7, 10, and 11, the electrical distribution system 66 comprises a bus frame having a plurality of leads 68, 70, 72, and 74. Leads 68, 70, 72, and 74 are preferably formed from metal stampings. More preferably, leads 68, 70, 72, and 74 comprise brass, copper, silver, or alloys thereof, or any other suitable conductive material. Leads 68, 70, 72, and 74 are generally planar but include, at their proximate ends, projecting motor connectors 76, 78, 80, and 82, which extend into and electrically couple to motors 24 and 25. As best shown in FIG. 6, connectors 76, 78, 80, and 82 extend from leads 68, 70, 72 and 74 into receptacles 24b and 25b provided in motors 24 and 25. Preferably, connectors 76, 78, 80, and 82 slide and plug into receptacles 24b and 25b and are frictionally engaged in receptacles 24b and 25b so that motors 24 and 25 are releasably coupled to electrical distribution system 66 and can be readily and easily removed from actuator housing 18 for replacement or service. Again, the soldered connections associated with the conventional actuator motors are eliminated, which results in significant savings of time and costs.

As illustrated in FIG. 7, leads 70, 72 extend from the negative terminals of each of the motors 24 and 25 to provide a ground path for the motors. Leads 68, 74 extend from the positive terminals of the motors 24 and 25 to provide power to the motors. In the preferred embodiment shown in FIG. 4, a plurality of wires 84, 86, and 88 provide external connections for the leads and are electrically connected to the distal ends 68a, 70a and 74a of leads 68, 70, 72, and 74 and are molded with the leads and the first housing member 19. In the illustrated embodiment, leads 70, 72 have a common distal end 70a and, therefore, only three wires are needed. It should be understood, however, that leads 70, 72 may have separate distal ends, in which case four wires would be needed to couple to the four distal ends of the four leads.

Figure 9:
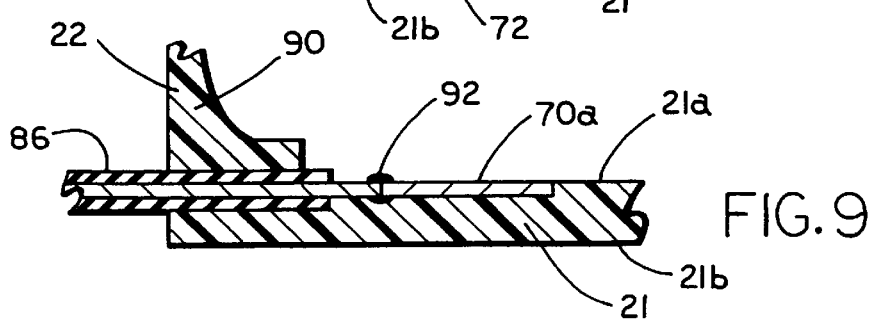
FIG. 9 is an enlarged sectional view taken along line IX—IX of FIG. 7 illustrating the ground lead of the bus and its electrical connection to an insulated wire.
Figure 10:
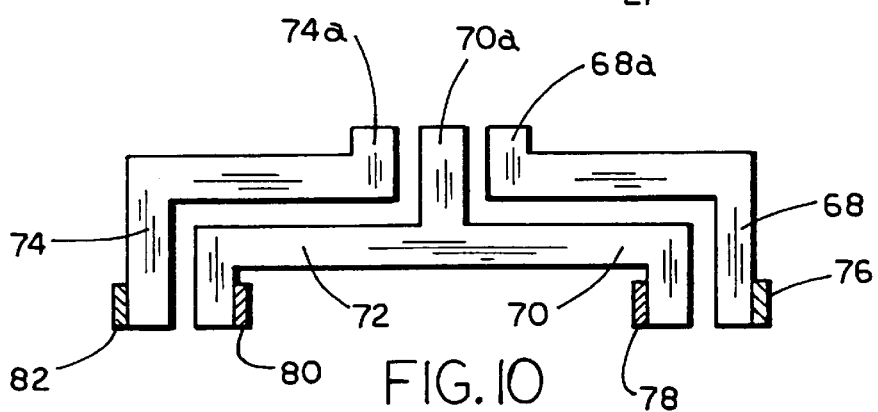
FIG. 10 is a top plan view of the bus bars of the actuator assembly of FIG. 1.
Figure 11:
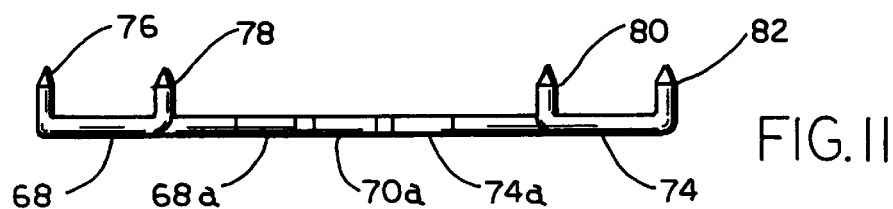
FIG. 11 is an elevation of the bus bars of FIG. 10.

Wires 84, 86, and 88 are preferably insulated and extend from the actuator housing 18 through an end wall section 90 of side wall 22 for connection to the vehicle power supply. In FIG. 9, only wire 86 is shown extending through end wall section 90 and coupling to distal end 70a with an electrical connection 92, but it should readily understood that all three wires extend through end wall and couple to the respective distal ends of the leads. As a portion of the wires are molded along with leads 68, 70, 72, and 74 and first housing member 19, no sealant is needed between the external connectors and the housing. The resinous material of first housing member 19 completely encapsulates that portion of the electrical bus system that is molded with the side wall 22 leaving no gaps or spaces for contaminants to enter. Moreover, vibration that would potentially jeopardize a conventional connection is eliminated as the connections 92 between the wires and leads are also molded with the leads 68, 70, 72, and 74, wires 84, 84, and 88, and the first housing member 19.

Figure 12:
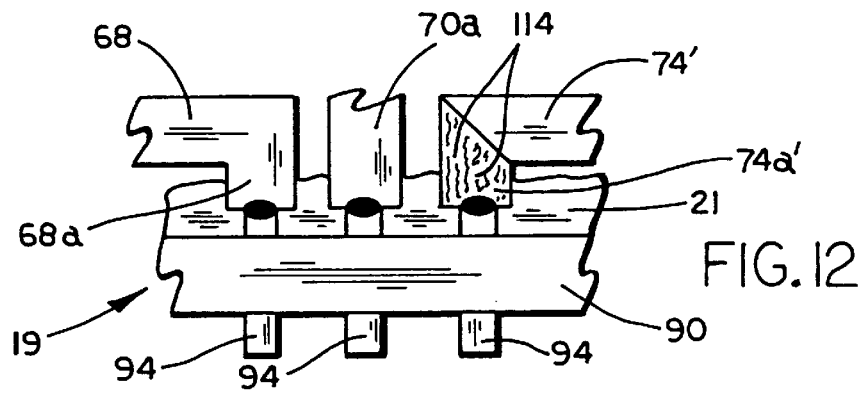
FIG. 12 is a top plan view of a second embodiment of the actuator assembly base with pins coupled to the bus bar.

In the second preferred embodiment shown in FIG. 12, conductive pins 94 are coupled to the leads' distal ends 68a, 70a, and 74'a and project from actuator housing 18. Pins 94 are preferably electrically coupled to distal ends 68a, 70a, and 74'a by one or more electrical connection methods, such as crimping, welding, insulation displacement, soldering, or other suitable known means of electrical termination. Pins 94 extend exteriorly of the first housing member 19 through end wall portion 90 of first housing member 19 for connection to the vehicle power supply. Pins 94 may comprise any suitable conductive material. More preferably, pins 94 are metal. Most preferably, pins 94 comprise brass, copper, silver, or alloys thereof. Projecting pins 94 are best suited for an external power supply system that includes a female plug connector. FIG. 12 also includes an alternative embodiment of lead 74', as will be hereinafter more fully explained.

Several embodiments of the external connectors are described below, with each embodiment offering different structures and methods of coupling to the vehicle power supply. By way of these several embodiments, the present invention is adaptable to connect to almost any power supply system. But in each of these alternative embodiments, a portion of the external connectors are integrally molded along with the electrical distribution system 66 and the first housing member 19 to maintain a gap free externally projecting connection that does not require sealing. Moreover, several of the embodiments eliminate all soldered connections, further reducing the complexity and costs of actuator assembly process and further enhancing the reliability of the actuator assembly.

Figure 13:
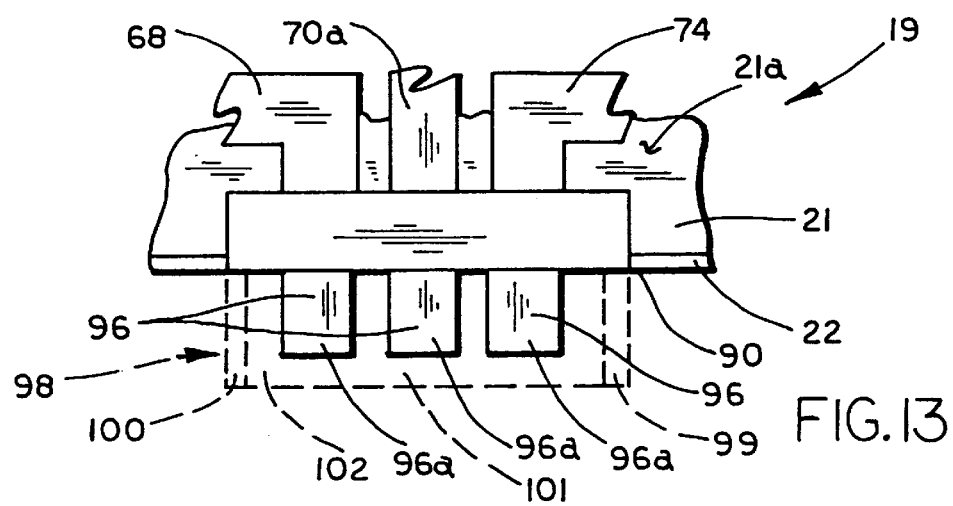
FIG. 13 is a top plan view of a third embodiment of the actuator assembly base with the bus bar extending from the base forming a male plug connector.

In FIG. 13, another preferred embodiment is shown in which the distal ends 68a, 70a, and 74a of leads 68, 70, 72, and 74 extend exteriorly of the first housing member 19 to form prongs 96 which provide external connectors for the vehicle power supply. Again, no sealant is required as the leads extending exteriorly of the first housing member are molded in their configuration and, hence, no gaps exist between the projecting leads and the housing. Moreover, the potential for vibration is eliminated as the entire electrical distribution system including the external connectors are molded with the first housing member 19. Again, prongs 96 are best suited for a vehicle power supply system that includes a female plug connector.

In yet another embodiment, prongs 96 extend into a plug receiving port 98 shown in phantom in FIG. 13. Receiving port 98 is preferably formed from the same material as the actuator housing 18, but may comprise ABS, PBT, acetal, or other suitable molding or melt processible resins. Receiving port 98 includes four spaced apart side walls 99, 100, 101, and 102. Walls 99, 100, 101, and 102 extend from end wall portion 90 of first housing member 19 and are preferably molded along with the first housing member 19. In the illustrated embodiment, walls 99, 100, 101, and 102 extend beyond the distal ends 96a of prongs 96 to protect the prongs from damage. But it should be understood prongs' distal ends 96a may extend beyond the terminal ends of walls 99, 100, 101, and 102. Moreover, receiving port 98 may be separately formed from first housing member 19.

Figure 14:
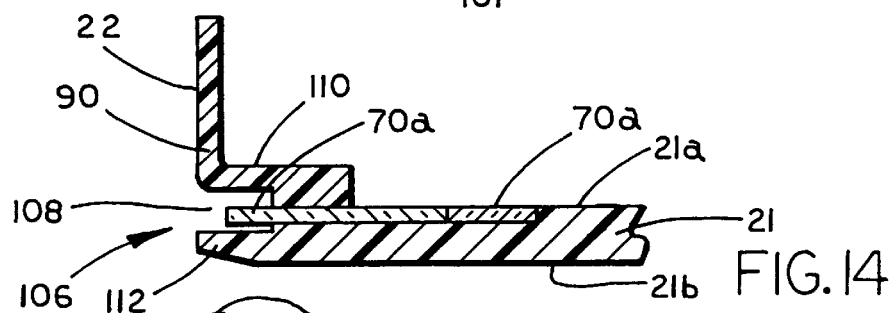
FIG. 14 is a sectional view of a fourth embodiment of the actuator assembly base with the bus bar forming a female plug.

In a fourth embodiment of the electrical distribution system, distal ends 68a, 70a, and 74a of leads 68, 70, 72, and 74 extend into a plug receptacle 106. Receptacle 106 is formed in the end wall portion 90 of first housing member 19 and is surrounded by four side walls 108, 110, 112, and a fourth wall that is not shown. As best shown in FIG. 14, the lead distal ends 68a, 70a, and 74a extend into receptacle 106 (only 70a is shown) to provide an internal plug connection.

Figure 15:
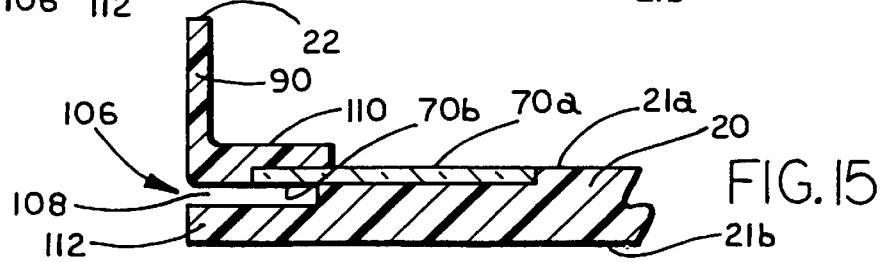
FIG. 15 is a sectional view of a fifth embodiment of the actuator assembly base with the bus bars inset into a surface of a receptacle for a plug receptacle.

FIG. 15, a fifth embodiment is shown in which leads 68a, 70a, and 74a extend into receptacle 106 and are molded with one of the four walls of receptacle 106. Each lead distal end 68a, 70a, and 74a includes an exposed contact surface facing into receptacle 106. FIG. 15 illustrates only one distal end 70a molded in wall 110 and only shows exposed surface 70b, but it should be understood to those persons having ordinary skill in the art, that distal ends 68a and 74a extend into receptacle 106 in a like manner. Preferably, distal ends 68a, 70a, and 74a extend into wall 110 so that leads 68, 70, 72, and 74 are flush with the interior surface of receptacle 106 and can remain planar and require no bending, other than for motor connectors 76, 78, 80, and 82 which are preferably formed by bending the proximate ends of leads 68, 70, 72, and 74.

While FIGS. 6, 8, 9, 14, and 15 illustrate the various embodiments of the electrical distribution system 66 with the leads molded flush with the top surface 21a of base wall 21, it should be understood that leads 68, 70, 72, and 74 may be equally molded so that the leads are flush with bottom surface 21b of base wall 21. Moreover, leads 68, 70, 72, and 74 may be encapsulated in base wall 21 and positioned at any point between top surface 21a and 21b, from the first flush position to the second flush position.

As described above, the electrical distribution system 66 preferably comprises a plurality of leads formed from a conductive material. More preferably, the leads are formed from a metal stamping and, most preferably, formed from brass, copper, silver, or alloys thereof. Likewise, wires 84, 86, and 88 and pins 94 are also most preferably brass, copper, silver, or alloys thereof. However, the electrical distribution system 66 may also comprise a conductive resinous material insert that is molded with the first housing member. The insert preferably includes a plurality of insert leads (only one insert lead 74' is shown) having substantially conductive fibers 114, such as stainless steel or carbon, which provide an electrical distribution path through the insert and, therefore when installed, through the housing base compartment. As best shown in FIG. 12, conductive fibers 114 are randomly or otherwise dispersed in a polymer matrix to form the insert leads to provide a conductive path from one end of the insert to the other end of the insert. Furthermore, the inserts may comprise non-conductive substrates which are plated or coated or otherwise deposited with a substantially conductive material such as a thin metal coating or other conductive coatings to thereby form an electrical distribution system thereon. Alternatively, the housing members may comprise a substantially non-conductive resinous material having a substantially conductive material plated, coated, imprinted, or otherwise deposited on to the base of the first housing to form an electrical distribution path. The substantially conductive material includes aluminum, copper, or alloys thereof, or other suitable metallic conductors.

From the foregoing, it should be understood that the electrical distribution system of the present invention offers several advantages over conventional electrical distribution systems. First, the integrally molded electrical distribution system eliminates vibration problems as there are no gaps or spaces between the electrical distribution system 66 and first housing member 19 and the electrical distribution system is continually supported from the side wall of the first housing member to the point of connection to the motor. Second, it is far less labor intensive, and the potential for mis-wiring is essentially eliminated. Moreover, the need for a sealant between the external connectors for the electrical distribution system and the housing is eliminated. Again, the electrical distribution system is molded with the first housing member, leaving no space between the housing and the projecting external connectors. Thus, a more reliable electrical distribution is discussed that requires less labor and material costs.

Furthermore while several forms of the invention have been shown and described, other forms will now be apparent to those skilled in the art. For instance, the projecting motor connectors may be separate members that are soldered or other wise electrically coupled to the leads before molding. Moreover, the motor connectors may comprise receptacles into which a motor's projecting terminals may extend. The embodiments of the invention shown in the drawings and described above are not intended to limit the scope of the invention which is defined by the claims which follow.

What is claimed is:

1. An actuator housing for vehicular rearview mirrors comprising:

a base member adapted for supporting at least one mirror positioning member and at least one motor for driving the mirror positioning member, said base member including an integrally molded electrical bus system and electrical connectors, said electrical bus system including a substantially planar frame and projecting motor connectors extending from proximate ends of said substantially planar frame for electrically coupling said planar frame to the motor, said electrical connectors coupling to said planar frame for electrically coupling said planar frame to a vehicle power supply, at least a portion of said electrical connectors and said planar frame being integrally molded with said base member and being sealed with said base member leaving no space between said portion and said base member thereby leaving no space for contaminants to enter said base member and sealing said portion with said base member.

2. An actuator housing for vehicular rearview mirrors according to claim 1, wherein said planar frame comprises a metal stamping.

3. An actuator housing according to claim 1, wherein said electrical connectors comprise pins.

4. An actuator housing according to claim 3, wherein said pins comprise brass pins.

5. An actuator housing for vehicular rearview mirrors comprising:

a base member adapted for supporting at least one mirror positioning member and at least one motor for driving the mirror positioning member, said base member including an integrally molded electrical bus system and external connectors, said electrical bus distribution system including a substantially planar frame and projecting motor connectors extending from proximate ends of said substantially planar frame for electrically coupling said planar frame to the motor, said planar frame comprising a metal stamping, said frame including a plurality of leads, at least one lead providing a ground path for the motor, and at least one lead providing a power supply lead for the motor, said external connectors coupling to said planar frame and extending outwardly from a portion of said base member for electrically coupling said planar frame to a vehicle power supply, at least a portion of said external connectors and said planar frame integrally molded with said base member, thereby sealing said external connectors with said portion of said base member.

6. An actuator housing for vehicular rearview mirrors according to claim 5, wherein said leads comprise brass stampings.

7. An actuator housing according to claim 5, said external connectors comprise said plurality of leads extending through and out of said base member and forming prongs for coupling to the vehicle power supply.

8. An actuator housing for vehicular rearview mirrors comprising:

a base member adapted for supporting at least one mirror positioning member and at least one motor for driving the mirror positioning member, said base member including an integrally molded electrical bus system and external connectors, said electrical bus distribution system including a substantially planar frame and projecting motor connectors extending from proximate ends of said substantially planar frame for electrically coupling said planar frame to the motor, said external connectors coupling to said planar frame and extending outwardly from a portion of said base member for electrically coupling said planar frame to a vehicle power supply, said external connectors comprising at least two wires electrically coupled to said planar frame, a first of said wires electrically coupled to a ground path of said planar frame, a second of said wires electrically coupled to a power path of said planar frame, said wires extending through and outwardly from a side wall of said base member for electrically coupling said electrical bus system to the vehicle power supply, at least a portion of said external connectors and said planar frame integrally molded with said base member thereby sealing said external connectors with said portion of said base member.

9. An actuator housing for vehicular rearview mirrors comprising:

a base member being adapted for supporting at least one positioning member and at least one motor for driving the position member, said base member including an integrally molded electrical bus system, said electrical bus system having a plurality of terminals and a plurality of electrical connectors, said terminals for electrically coupling to respective motor terminals of the motor, said electrical connectors for electrically coupling said electrical bus system to a vehicle power supply, at least a portion of said electrical connectors being integrally molded with a portion of said base member leaving no space between said portion of said electrical connections and said portion of said base member thereby leaving no space for contaminants to enter said base member.

10. The actuator housing according to claim 9, wherein said electrical connectors comprise at least two pins.

11. The actuator housing according to claim 9, wherein said electrical bus system includes metal stampings providing conductive paths from said terminals to said electrical connectors.

12. The actuator housing according to claim 11, wherein said metal stampings comprise brass stampings.

13. The actuator housing according to claim 11, wherein said base member includes a base wall, said metal stampins being molded in said base wall.

14. The actuator housing according to claim 11, wherein said metal stampings each include a generally planar body.

15. The actuator housing according to claim 11, wherein said metal stampings extend exteriorly of said base member providing said electrical connectors.

16. The actuator housing according to claim 11, wherein said electrical connectors comprise pins, said pins being coupled to said respective metal stampings.

17. The actuator housing according to claim 11, wherein said electrical connectors comprise wires, said wires being coupled to said metal stampings.

18. The actuator housing according to claim 11, wherein said metal stampings form a plurality of leads, said leads including at least one ground lead and at least one power supply lead.

19. The actuator housing according to claim 9, wherein said base member includes a plug receiving port, said electrical connectors extending into said plug receiving port for coupling said electrical distribution system to the vehicle power supply.

20. The actuator housing according to claim 9, wherein said terminals comprise projecting motor connectors for electrically coupling said electrical bus system to the motor.

21. The actuator housing according to claim 20, wherein said electrical motor connectors comprise projecting prongs for extending into receptacles in the motor.

22. The actuator housing according to claim 9, wherein said electrical bus system further includes conductive paths extending between said terminals and said electrical connectors.

* * * * *